Dec. 6, 1966          R. I. MASON ETAL          3,290,642
                      DIRECTIONAL SONOBUOY
                      Filed Jan. 8, 1965
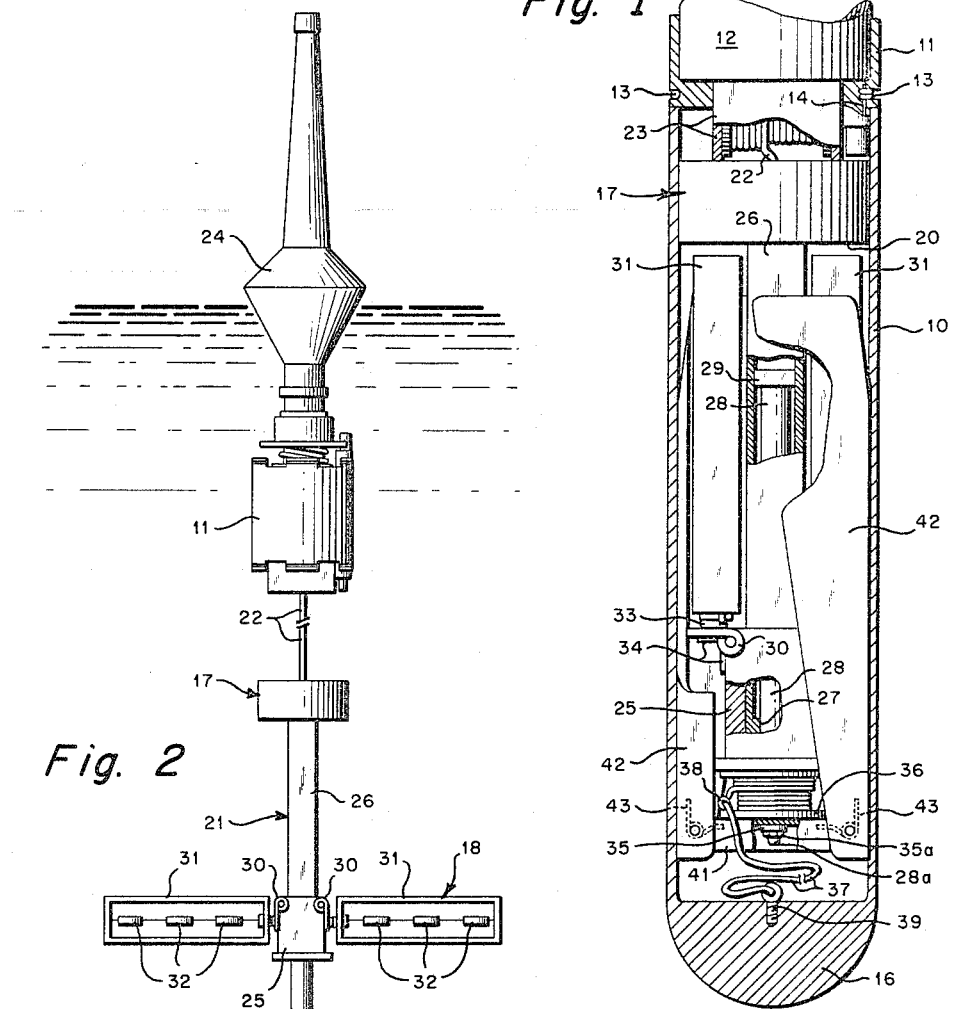
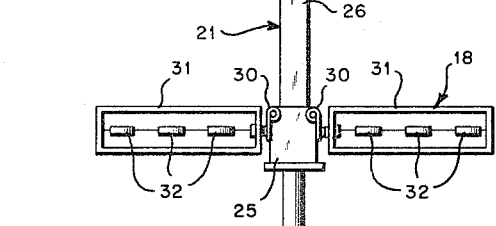
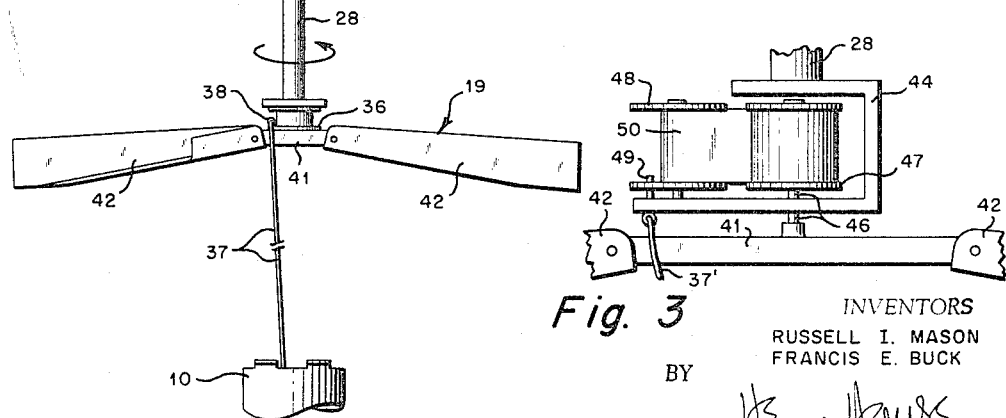
INVENTORS
RUSSELL I. MASON
FRANCIS E. BUCK
BY
*Henry Hausen*
ATTORNEY … …
United States Patent Office 3,290,642
Patented Dec. 6, 1966

3,290,642
DIRECTIONAL SONOBUOY
Russell I. Mason, Doylestown, and Francis E. Buck, Warminster, Pa., assignors to the United States of America as represented by the Secretary of the Navy
Filed Jan. 8, 1965, Ser. No. 424,448
10 Claims. (Cl. 340—2)

The invention described herein may be manufactured and used by or for the Government of the United States of America for governmental purposes without the payment of any royalties thereon or therefor.

The present invention relates to underwater communications apparatus, and more particularly to a directional sonobuoy for the detection and localization of underwater sound sources.

Current ASW (anti-submarine warfare) systems in which search aircraft are employed, utilize air-launched sonobuoys such as disclosed in U.S. Patent 3,093,808 to Tatnall et al. for Air-dropped Miniature Sonobuoy, issued June 11, 1963. Such sonobuoys must initially be packaged into a compact, ballistic configuration for launching from the aircraft at a relatively high velocity, and then be automatically transfigured upon immersion in the ocean into an operational sonobuoy for detecting underwater targets such as a submarine. Prior art air-launched sonobuoys are usually of the omnidirectional type and useful only for detection. Only in combination with other sonobuoys can they localize the sound source by triangulation or other mathematical solutions. Due to many difficulties and operational deficiencies, sonobuoys having directional response capabilities and being suitable for air launching were heretofore inadequate. Directional hydrophones were usually too large for packaging into a small, ballistic configuration for air-launching. For example, one prior art directional hydrophone utilizes an array of magnetostrictive or piezoelectric transducers spaced from each other in a horizontal plane, and rotated in said plane by motorized paddles or a reaction motor such as disclosed in U.S. Patent 2,828,475 to R. I. Mason, a co-inventor of the present invention, for Remote Control or Measurement Indicating Means, issued March 25, 1958. Attempts to construct a compact air-launched sonobuoy using these teachings placed the hydrophone and propelling motor in close proximity to each other producing thereby an acoustic coupling. That is, the propelling motor generated intolerable turbulence and noise at the hydrophone.

Accordingly, it is an object of the present invention to provide a novel and improved directional sonobuoy which is particularly adapted to be dispensed from an aircraft into the water and to be automatically transformed after immersion in the water for the detection and localization of underwater sound sources.

Another object of the invention is to provide an air-launchable sonobuoy in which a directional transducer array is automatically deployed for 360° horizontal scanning upon immersion in the water, and in which the scanning motor is substantially acoustically isolated from the transducer array.

Still another object of the invention is to provide a novel motor for imparting continuous scanning to a directional hydrophone during normal operation.

A further object of the invention is to provide an air-launchable directional sonobuoy which is relatively simple in design, inexpensive and expendable, and rugged and reliable under severe operating conditions.

Various other objects and advantages will appear from the following description of several embodiments of the invention, and the most novel features will be particularly pointed out hereinafter in connection with the appended claims.

In the drawing:

FIG. 1 represents a longitudinal cross section of the forward end of an air-dropped sonobuoy of the present invention prior to being immersed in water;

FIG. 2 is a pictorial illustration in elevation of the sonobuoy of FIG. 1 after being immersed in the water and transformed into its operational condition for detecting and localizing underwater sounds and for transmitting radio signals indicative of the sounds and direction thereto; and FIG. 3 illustrates an alternative embodiment of a motor used in the sonobuoy of FIGS. 1 and 2.

As will be described in more detail hereinbelow, the present invention generally contemplates a directional sonobuoy which is initially packaged into a compact, ballistic profile suitable for launching from an aircraft at relatively high speeds, and upon immersion in water the ballistic configuration is automatically transformed into an operational device suitable for detecting and localizing underwater sound sources. The sonobuoy utilizes conventional flotation and transmitting apparatus for supporting the sonobuoy at the water surface and for transmitting radio signals indicative of detected sounds and directional information. This is accomplished by a unique directional hydrophone assembly, depending from the flotation apparatus, which includes a telescoping torque shaft to which a compass, transducer array and motorized paddle are affixed. The paddle provides continuous 360° horizontal scanning by the transducer array during normal operation. In one embodiment, the driving force for scanning is derived from the potential energy of a descending weight, and in an alternative embodiment, the potential energy derives from the recoiling of a longitudinally pre-stressed spring. The hydrophone assembly in both embodiments is retractable into an overall size and configuration suitable for being inserted into a casing of ballistic profile and is deployable after immersion in the water into an operational directional sonobuoy. As will become apparent hereinbelow, maximum utilization of space, light weight, and simplicity in design are notable achievements.

Now referring to the illustrated embodiment of FIG. 1, the hydrophone portion of a sonobuoy is shown nested in a forward casing 10 whose outline defines a ballistic profile suitable for air-launching at high speeds. The remaining portion of the sonobuoy as contained in the ballistic profile, shown fragmentarily by the aft casing 11 and transmitter 12, may be of any conventional design such as disclosed in U.S. Patent 3,093,808, supra. The two casings 10 and 11 are connected end to end by intermeshing bosses peripherally arranged on the casings and form thereby a continuous circumferential groove. A hoop spring 13 and squib-released pin 14 retain the connection. A more detailed description of the operation of the hoop spring appears in U.S. Patent 3,047,259 to Tatnall et al. for Speed Brake Retarding Mechanism for an Air-dropped Store, issued July 31, 1962. The nose portion 16 of the forward casing 10 is weighted to provide a positive and rapid sink rate when the latter becomes detached from the aft casing 11 by operation of the hoop spring 13.

But for the weighted nose portion 16, the forward casing 10 is adapted to receive a hydrophone assembly generally comprising a compass 17, directional transducer 18, and motorized paddle 19 operatively connected to each other by a telescoping torque tube 21. The hydrophone assembly is electrically connected to the input of the transmitter 12 by an electrical cable 22 pre-wound on a reel 23 which, in turn, is rotatably secured on the forward end of the aft casing 11. As the detached forward casing 10 and the hydrophone assembly contained therein sink in the water, the cable 22 pays out to a desired listening depth, for example, 300 feet. During sonar operation, the cable 22 conducts acoustical and bearing information from the transducer 18 and compass 17, respectively, to the transmitter 12. As disclosed in U.S. Patent 3,093,808, supra, the information is transmitted to a remote receiver station through an antenna erected inside the flotation balloon, identified in the drawing by the numeral 24.

In the ballistic profile of FIG. 1, the hydrophone assembly is inserted with the various elements nestled within the casing 10 in a manner now to be described. The telescoping torque shaft 21 includes a hollow rectangular shaft 26 coaxially secured at one end thereof to a cylindrical housing 20 of the compass 17. The outside diameter of the housing 20 permits slidable insertion into and removal from the casing 10. The compass 17 may be of any conventional type in which bearing information is translated into an electrical signal for modulating the input of the transmitter 12. Such a compass is disclosed in U.S. patent application Serial No. 269,219, by Samuel Pure, filed March 29, 1963, now Patent No. 3,206,719. The other end of the rectangular shaft 26 contains a circular opening 27 of reduced diameter through which a circular rod 28 slides. The insertion end of the rod 28 defines a rectangular boss 29 dimensioned to be slidable along the length of the rectangular shaft 26 and to prevent rotation relative thereto.

The transducer 18 includes a pair of elongated reflectors 31 which are pivotally connected at their longitudinal axes to oppositely disposed hinges 30 which, in turn, are pivotally connected to a collar 25, secured on the shaft 26, on parallel axes which are orthogonally fixed relative to the longitudinal axes of both the shaft 21 and the reflectors 31. The reflectors 31 are trough-like rigid members each containing a plurality of piezoelectric or magnetostrictive elements 32 connected in a line-type array for achieving directional response characteristics. As shown in the retracted configuration of FIG. 1, the open sides of the reflectors 31 face inward. Helical springs 33 operatively connected between their respective reflectors 31 and hinges 30 urge the reflectors 31 to rotate about their longitudinal axes into a position where the open sides face in the same direction when deployed into the position shown in FIG. 2. The deployed position is achieved by another pair of springs 34 (only one shown) operatively connected between their respective hinges 30 and the collar 25. The manner in which the reflectors 31 are maintained in the retracted position shown in FIG. 1 will become apparent following the more detailed description hereinbelow of the motorized paddle 19.

The end of shaft 28 which extends out from the tube 26 is coaxially fixed against relative rotation to a spool 36 on which a flexible line 37, such as nylon, is wound. The payout end of the line 37 passes through an eyelet 38 secured on a blade hub 41 which guides the line 37 away from the spool 36, and then connects to the casing 10 at the weighted nose portion 16 in any convenient manner such as by an eyebolt 39. The rod 28 terminates in a threaded stud 28a on which the hub 41 is mounted by a washer 35 and nut 35a for freely rotating relative to the spool 36 and the rod 28. The hub 41 pivotally supports a pair of oppositely disposed thin blades 42 on parallel axes which are normal to the axis of the rod 28. The blade surfaces are relatively large in area and coincide with a plane along the axis of the shaft 21. A pair of springs 43 operatively connected between the respective blades 42 and the hub 41 urge the blades 42 into a deployed position substantially normal to the longitudinal axis of the torque shaft 21.

In the retracted position required for the ballistic configuration shown in FIG. 1, the rod 28 is inserted in the shaft 26 until the spool 36 abuts the collar 25, and the cable 37 is fully wound on the spool 36 but for the slight amount needed during insertion of the hydrophone assembly into the casing 10. The reflectors 31 and the blades 42 are aligned together and urged into their retracted positions against the force of springs 34 and 43. They are held in the retracted position by the casing 10 after insertion therein. It will be observed that the open sides of the reflectors 31 are held in the position facing inward against the force of springs 33 by the sides of the blades 42.

An alternative embodiment of the present invention is illustrated in FIG. 3. In this instance, the rod 28 of the torque shaft 21 is secured at its outer end to one side of a rigid U-shaped member 44, and the other side rotatably supports the hub 41 on a spindle 46 which is coaxial with the rod 28. The spindle 46 is rigidly connected to a supply spool 47 for rotation therewith. A takeup spool 48 adjacent to the spool 47 is rotatably mounted on the member 44 for relative rotation on an axis parallel to the shaft 46. A constant force spring 50, such as manufactured under the trade name Negator, is wound on the spool 47 against the bias of being wound on the spool 48. Such a spring is pre-stressed along its length so that it has a constant recoil tension at any stage of uncoiling. Such a spring provides a substantially constant torque output to the rod 28 when the blades 42 are held stationary. A cotter pin 49, releasably inserted through the member 44 and the spool 48, prevents relative rotation therebetween until removed. A lanyard 37' connected between the cotter pin 49 and the weighted portion 16 of the casing 10 provides this action.

OPERATION

The operation of the inventive embodiment should now be apparent. In the embodiment of FIGS. 1 and 2, the sonobuoy is launched from an aircraft in the ballistic profile. Upon entering the water, squib-activated pin 14 releases the hoop spring 13 to disengage the forward casing 10 from the aft casing 11 which becomes buoyant. Due to the weighted nose portion 16, the casing 10 and the hydrophone assembly therein begins to descend as cable 22 pays out from the reel 23. Of course, in the meantime, the flotation balloon 24 and the transmitter antenna in the casing 11 have been erected in the manner described in U.S. Patent 3,093,808, supra. At a preselected effective sonar listening depth, cable payout ceases halting further descent of the hydrophone assembly. Due to the weight of the nose portion 16, the casing 10 continues to descend and slide off. When completely free of the casing 10, the blades 42 and reflectors 31 spring outward into their deployed positions. As the casing 10 further descends, the rod 28 slides out from the tube 26 until the boss 29 engages the edge of the reduced opening 27. The hydrophone assembly is now completely sonar operational as shown in FIG. 2. Further descent of the casing 10 now causes a torque at the spool 36 causing the torque shaft 26, hydrophone 18, and compass 17 to rotate relative to the blades 42. That is, the unreeling rotates these elements against back pressure of the relatively large surface areas of the blades 42. In a typical application, the hydrophone assembly will rotate at approximately four revolutions per minute.

Operation of the alternative embodiment shown in FIG. 3 differs only with respect to the manner in which the transducer array 18 is rotated. When the casing 10 completely slides off the hydrophone assembly, and the lanyard 37' is extended, the cotter pin 49 is pulled and the spring 50 commences to recoil onto the spool 48. Due to the relatively large blades 42, the torque shaft 21, hydrophone 18 and compass 17 rotate against the back pressure on the blades 42 in the same manner as described for the spool arrangement of FIGS. 1 and 2.

It is further contemplated that an electric motor can be substituted for the motors of FIGS. 1, 2 and 3 without departing from some of the inventive concepts set forth herein.

Many of the attendant advantages of the invention as described herein should now be apparent. The invention provides a directional sonobuoy which is retractable into a ballistic profile for dispensing from an aircraft into the water and automatically transformable after immersion in the water for the detection and localization of underwater sound sources. In the transformation, the sonobuoy is automatically deployed for 360° of horizontal scanning while the scanning motor is substantially acoustically decoupled from the transducer array thereby eliminating intolerable turbulence and noise during sonar operation. It will also be observed in the one embodiment that the weight of the casing as it descends provides an additional advantage in that it helps to maintain the transducer array in a horizontal position under sonobuoy drift conditions.

It will be understood, of course, that various changes of the details, materials, steps and arrangement of parts, which have been herein described and illustrated in order to explain the nature of the invention, may be made by those skilled in the art within the principle and scope of the invention as expressed in the appended claims.

What is claimed is:
1. A directional sonobuoy comprising:
   a buoyant means;
   a directional hydrophone means depending from said buoyant means; and
   motor means drivingly connected to said hydrophone means for causing the latter to rotate, said motor means being slidable relative to said hydrophone means along the rotation axis for acoustically isolating said motor means during normal sonar operation.
2. A directional sonobuoy as recited in claim 1 wherein said buoyant means further comprises:
   an aft casing having therein a flotation means and radio transmitter operative upon immersion in water.
3. A directional sonobuoy as recited in claim 2 wherein said hydrophone means further comprises:
   a forward casing connected to said aft casing forming thereby a compact profile and having means activated upon immersion in water to separate said forward and aft casings;
   a directional transducer removably inserted in said forward casing; and
   a pre-wound cable operatively connected for pay out between said transmitter and said transducer;
   said forward casing being released, said transducer being removed, and said cable being paid out upon immersion in water.
4. A directional sonobuoy as recited in claim 3 wherein said motor means further comprises:
   a torque rod slidable in and out of said hydrophone means;
   paddle means removably inserted in said forward casing and rotatably connected to the outer end of said rod; and
   force-exerting means operatively connected between said paddle means and said rod.
5. A directional sonobuoy as recited in claim 4 wherein said transducer further comprises:

a torque shaft for slidably receiving said torque rod along the length thereof;
a pair of elongated reflectors, each pivotally connected at one end thereof to said torque shaft for folding said reflectors into positions adjacent to and along the length of said torque shaft; and
a plurality of electro-acoustical elements connected along the length of said reflectors.
6. A directional sonobuoy as recited in claim 5 wherein said paddle means further comprises:
   a hub rotatably connected to the outer end of said torque rod;
   a plurality of blade means, each pivotally connected at one end to said hub for closing said blades into positions adjacent to and along the length of said torque shaft when said torque rod is fully inserted therein.
7. A directional sonobuoy as recited in claim 6 wherein said force-exerting means further comprises:
   a spool secured to said torque rod for rotation therewith; and
   a flexible line pre-wound on said spool and secured at the free end thereof to said forward casing.
8. A directional sonobuoy as recited in claim 7 wherein said hydrophone means further comprises:
   compass means having the housing thereof secured to said torque shaft for rotation therewith.
9. A directional sonobuoy as recited in claim 6 wherein said force-exerting means further comprises:
   a longitudinally pre-stressed spring means operatively connected between said hub and said torque shaft; and
   lanyard means removably inserted at one end in said torque rod and spring means and secured at the other end to said forward casing.
10. A directional sonobuoy as recited in claim 9 wherein said hydrophone means further comprises:
    compass means having the housing thereof secured to said torque shaft for rotation therewith.

References Cited by the Examiner
UNITED STATES PATENTS

| | | | |
|---|---|---|---|
| 2,361,177 | 10/1944 | Chilowsky | 340—2 |
| 3,022,462 | 2/1962 | Keiper | 340—2 X |
| 3,132,322 | 5/1964 | Maes | 340—2 |

FOREIGN PATENTS

| | | |
|---|---|---|
| 1,228,001 | 3/1960 | France. |

References Cited by the Applicant
UNITED STATES PATENTS

| | | |
|---|---|---|
| 2,828,475 | 3/1958 | Mason. |
| 3,116,471 | 12/1963 | Coop. |

CHESTER L. JUSTUS, *Primary Examiner.*

R. A. FARLEY, *Assistant Examiner.*